Jan. 17, 1956 L. INCORVAIA 2,730,878
BUTTER SAVER FOR "CORN ON THE COB"
Filed June 22, 1953
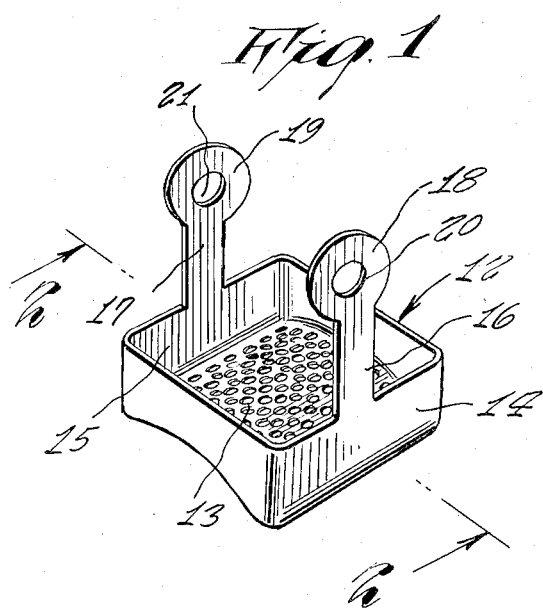
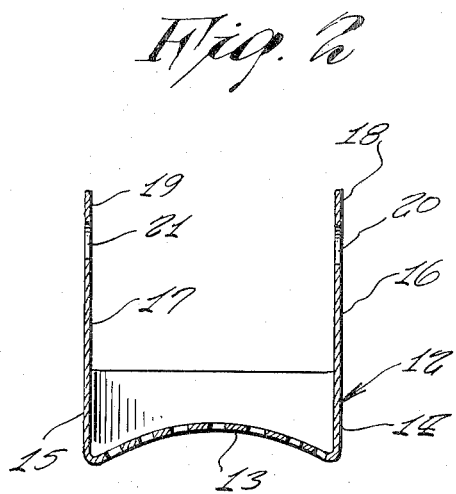
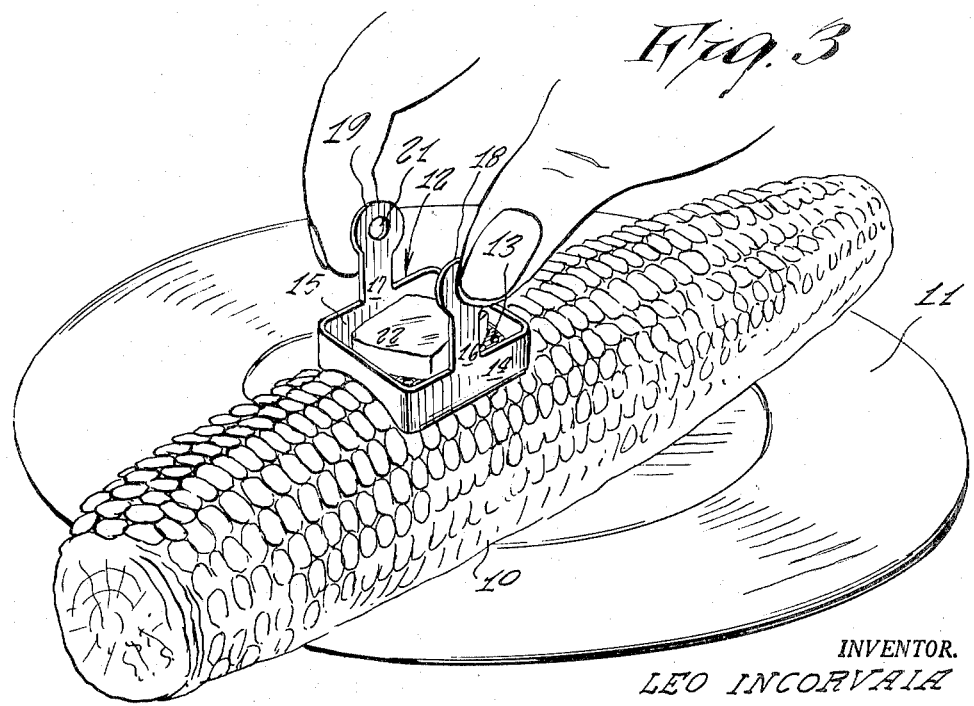
INVENTOR.
LEO INCORVAIA
BY Carl Miller
ATTORNEY

United States Patent Office 2,730,878
Patented Jan. 17, 1956

2,730,878

BUTTER SAVER FOR "CORN ON THE COB"

Leo Incorvaia, Bellerose, N. Y.

Application June 22, 1953, Serial No. 363,207

1 Claim. (Cl. 65—12)

This invention relates to butter dispensers and more particularly to such dispensers of the type adapted to be used with an ear of corn.

It is an object of the present invention to provide a butter saver for corn on the cob which will spread the butter evenly over the surface of the hot corn with a gentle up and down rubbing, the heat of the corn causing the butter to spread evenly with a simple rotation of the device over the entire surface of the corn.

It is another object of the present invention to provide a butter saver of the above type wherein the entire surface of the corn will be buttered with one-third of the amount normally required when the corn is buttered by a knife, effecting thereby an obvious economy.

Other objects of the present invention are to provide a butter saver for corn on the cob which is of simple construction inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a butter saver, embodying the features of the present invention and shown alone;

Fig. 2 is a vertical sectional view taken along the line 2—2 of Fig. 1 and

Fig. 3 is a perspective view showing the butter saver in operative use.

Referring now to the figures, 10 represents an ear of corn upon a plate 11.

In the practice of my invention, a butter saver is provided for the corn 10 and comprises a box-shaped portion 12 having an upwardly curved bottom wall 13 finely perforated. The side walls 14 and 15 of the box shaped member 12 are integrally formed along their upper edges with laterally aligned vertical arms 16 and 17, respectively, the arms 16 and 17 terminating in circular enlargements 18 and 19. The enlargements 18 and 19 are provided with central openings 20 and 21, effecting an economy of material and lightening of the device, while at the same time facilitating the gripping of the device between the thumb and index finger as shown in Fig. 3, the finger tips being received within the openings 20 and 21.

In operation, a slab of butter 22 (Fig. 3) is sliced from a standard four ounce butter stick (or a goodly amount of any other type butter) and placed on the upper surface of the curved wall 13 and the device gripped between the thumb and index finger at the circular enlargements 18 and 19. The heat of the corn 10, on which the device is placed with the curved bottom wall 13 conforming to the contour of the corn, will cause the butter, through the perforated bottom wall 13, to spread evenly. With a simple rotation in either a clockwise or counter-clockwise direction, the entire surface of the corn will be buttered with one-third the amount normally required when using a knife for the same purpose. Thus, the housewife will save all the previous butter normally lost in dishes when the knife is used for buttering the corn. A gentle rubbing up and down will spread the butter evenly over the entire surface. The corn will be rotated slowly while the device is rubbed gently up and down the length thereof.

It will be apparent that the device is extremely simple and economical to manufacture and requires only two machine operations, namely, cutting to size and perforation, and die pressing to shape.

It will be apparent that every home, restaurant, summer resort, hotel and hospital should be furnished with the device because the simplicity of the device gives every user the opportunity to enjoy every last bit of butter supplied for the purpose. The gadget can be kept with butter in refrigerators or ice boxes for indefinite periods of time, occupying very little space. When not in use, the device can be put away with the silverware or tableware, it being easily kept clean by washing with hot water and soap.

While various changes may be made in the detail construction, it shall be understood that such changes shall be within the spirit and scope of the present invention, as defined by the appended claim.

Having thus set forth and disclosed the nature of my invention, what is claimed is:

A butter saver for corn on the cob comprising a rectangular hollow body formed of thin sheet metal having a curved bottom wall equipped with perforations therein, two oppositely disposed bottom edges of the said body being upwardly curved and the two oppositely disposed other edges of the said body being straight, four oppositely disposed side walls extending upwardly integraly from the said body and adapted to surround the butter pat placed therein, the said bottom wall and hollow body together with the upwardly extending side walls being stamped out of sheet metal and then bent into the said body, the opositely disposed side walls having straight lower edges being integrally formed along the upper edges of the central portions thereof with vertical arms, circular enlargements integrally formed in the upper ends of said vertical arms adapted to permit the device to be grasped between the thumb and index finger.

References Cited in the file of this patent

UNITED STATES PATENTS

| D. 157,183 | Newell | Feb. 7, 1950 |
| 1,007,589 | McKinnon | Oct. 31, 1911 |
| 1,213,655 | Keil | Jan. 23, 1917 |
| 1,893,889 | Guerini | Jan. 10, 1933 |
| 2,094,446 | Clement | Sept. 28, 1937 |
| 2,300,684 | Maxfield | Nov. 3, 1942 |
| 2,444,116 | Rossi | June 29, 1948 |
| 2,478,122 | Mossel | Aug. 2, 1949 |
| 2,527,149 | Peterson | Oct. 24, 1950 |
| 2,560,008 | Steward | July 10, 1951 |